United States Patent [19]

Ritsema

[11] 4,382,492
[45] May 10, 1983

[54] DISC BRAKE HAVING A PISTON RETRACTION ASSEMBLY

[75] Inventor: Irving R. Ritsema, South Bend, Ind.

[73] Assignee: The Bendix Corporation, Southfield, Mich.

[21] Appl. No.: 248,650

[22] Filed: Mar. 27, 1981

[51] Int. Cl.³ .............................................. F16D 65/54
[52] U.S. Cl. ................................ 188/71.8; 188/196 P
[58] Field of Search ............... 188/71.8, 72.3, 72.4, 188/79.5 GE, 196 P, 370

[56] References Cited

U.S. PATENT DOCUMENTS 3,186,521 6/1965 Chouings .......................... 188/196 P
4,053,030 10/1977 Bainard et al. ............... 188/196 P X
4,088,084 11/1977 Kawaguchi et al. ....... 188/196 P X Primary Examiner—Duane A. Reger
Attorney, Agent, or Firm—Paul David Schoenle; Ken C. Decker

[57] ABSTRACT

A disc brake having a piston retraction assembly includes a caliper (12) receiving a piston (14) for biasing a friction pad (16) into engagement with a rotor (18). A recess (30) on the caliper receives the retraction assembly 32 and a boot assembly 34 cooperates with the retraction assembly (32) to limit movement of the latter with the piston (14). A resilient member (40) engages the boot assembly (34) to bias the piston (14) via friction ring (36) to return to its rest position.

2 Claims, 3 Drawing Figures

DISC BRAKE HAVING A PISTON RETRACTION ASSEMBLY

This invention relates to a disc brake having a piston retraction assembly. Upon termination of braking, it is desireable to retract a piston within a caliper to prevent drag between at least one friction pad and a rotor.

In order to control retraction for the piston, it has been proposed to use a friction sleeve which frictionally engages the piston and is movable through a predetermined distance with the piston during braking. The friction sleeve is biased to a rest position so that upon termination of braking the friction sleeve returns to its rest position and pulls or withdraws the piston with it, whereby relieving the normal forces exerted by the piston against a friction pad in the direction of the rotor. The piston is also movable relative to the sleeve to compensate for lining wear for the friction pad.

With the sleeve extending over a substantial length of the piston, it is important that manufacturing tolerances be closely maintained to provide truly concentric sleeves and pistons. Also, the sleeve slidably engages the wall of a caliper bore so that the outer sleeve dimension must be truly concentric with the caliper bore. The prior art is illustrated in U.S. Pat. No. 2,746,254, Lucien, May 22, 1956 and U.S. Pat. No. 2,934,174, Lucien, Apr. 26, 1960.

The invention provides a disc brake with a piston retraction assembly, a caliper defining a bore for receiving a piston to substantially form a pressure chamber, the pressure chamber receiving pressurized fluid during braking to move the piston relative to the caliper, the retraction assembly cooperating with the caliper and the piston to substantially control withdrawal for the piston relative to the caliper upon termination of braking and a boot assembly cooperating with the caliper and the piston to isolate a sliding interface therebetween from the environment, characterized by said caliper bore including a recess at the open end, said retraction assembly comprising a friction ring engaging said piston and a resilient member biasing said friction ring to a first position engaging said caliper, said friction ring and said resilient member being disposed within said recess and said boot assembly including a portion extending into said recess to engage said resilient member, said friction ring being movable to a second position in response to movement of said piston to also engage said boot assembly portion whereby said boot assembly portion limits movement for said friction ring.

The present invention provides the advantages of a simple assembly which substantially avoids the sliding fit established between the piston and the wall of the caliper bore. In addition, the boot assembly is modified to cooperate with the retraction assembly to reduce the number of parts required for a disc brake with a retraction assembly.

One way of carrying out the invention is illustrated in the accompanying drawings wherein.

Figure 1:
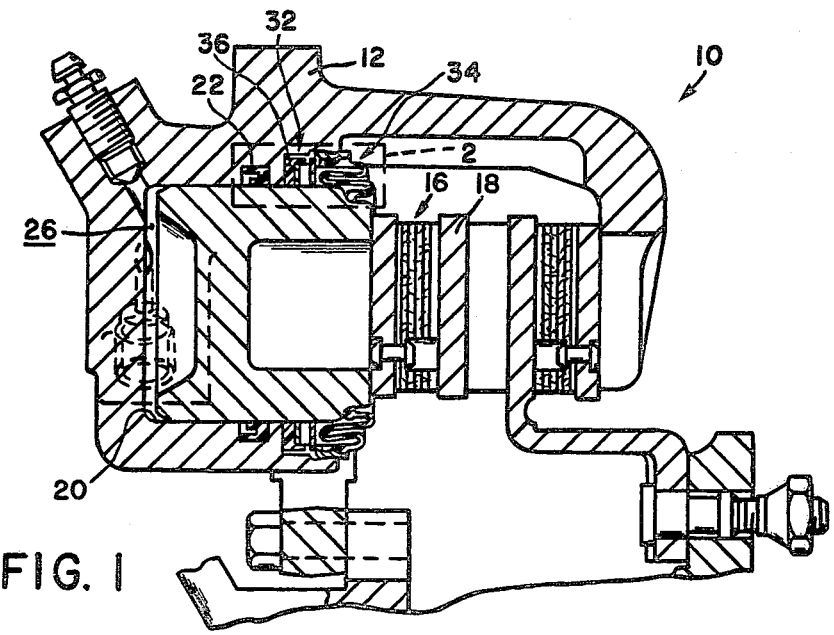
FIG. 1 is a cross sectional view showing a portion of a disc brake assembly with a piston in a rest position.

The disc brake 10 includes a caliper 12 cooperating with a piston 14 to urge at least one friction pad 16 into engagement with a rotor 18. The caliper 12 defines a bore 20 for slidably receiving the piston 14. A first recess 22 within the bore 20 receives a substantially frictionless seal 24 sealingly engaging the piston and the wall of the caliper recess 22 to form a pressure chamber 26. An inlet 28 on the caliper communicates fluid pressure to the pressure chamber during braking to move the piston 14 and friction pad 16 toward the rotor 18.

A second recess 30 at the open end of the bore 20 receives a retraction assembly 32 and a boot assembly 34. The retraction assembly 32 comprises a plastic annular friction ring 36 forming an interference fit with the piston 14. Consequently, the inner face 38 of the ring 36 tightly engages the piston to move the ring 36 therewith. The retraction assembly 32 also includes a wave spring 40 which extends into an inner recess 42 on the ring 36. The ring 36 is substantially L-shaped to form the inner recess 42 and the radially outer leg 44 forms a clearance 46 with the axially extending wall 48 of the second recess 30 to avoid interference between the wall 48 and the ring 36 when the latter moves with the piston 14.

The second recess 30 is provided with a groove 50 and the boot assembly 34 includes a metal element 52 which extends with the groove 50 to remain axially fixed thereto. The boot assembly 34 also includes a resilient portion 54 leading to a bushing 56 opposite the metal element. The bushing sealingly engages the piston 14 and the resilient portion 54 is sealingly attached to the metal element by suitable means such as bonding or impregnation to isolate the sliding interface between the piston 14 and the bore 20 from the environment surrounding the disc brake 10.

The metal element 52 includes a radially inwardly extending arm 58 opposing the leg 44 and the wave spring 40. When the friction ring 36 is abutting the radial shoulder 60 of recess 30 and the metal element of boot assembly 34 is disposed within groove 50, the arm 58 cooperates with the leg 44 to define an axial spacing 61. This spacing limits the movement of the friction ring 36 with the piston 14. In addition, the spacing defines a predetermined clearance between the friction pad 16 and the rotor 18.

Figure 2:
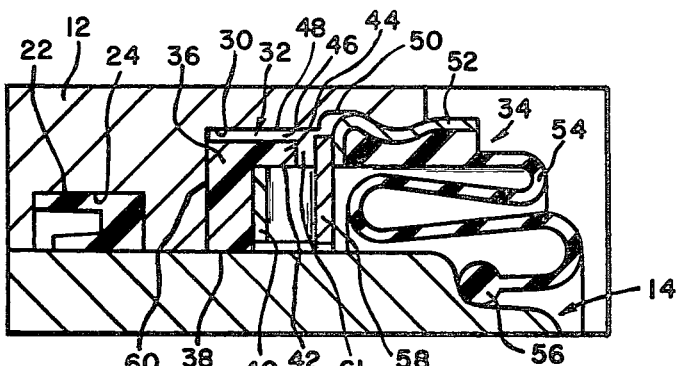
FIG. 2 is an enlarged view of the circumscribed portion 2 of FIG. 1.
Figure 3:
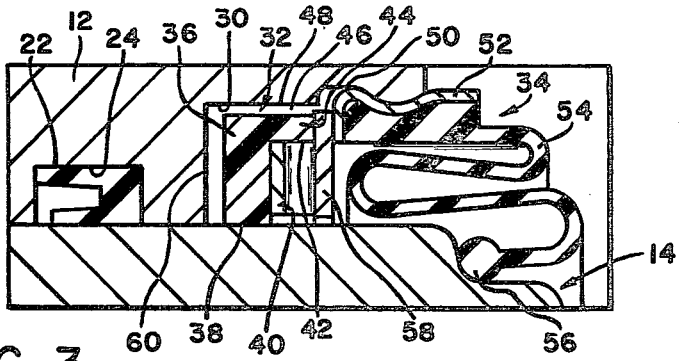
FIG. 3 is a view similar to FIG. 2 showing the piston in an applied position.

The reference numerals for FIG. 2 are equally applicable for the same parts shown in FIG. 3, which is illustrated without reference numerals for clarity of structure.

In the applied position of FIG. 3, the leg 44 is moved into engagement with the arm 58 and the friction pad 16 is engaging the rotor 18. During braking the wave spring 40 is compressed to fit completely within the inner recess 42. Upon termination of braking, the wave spring biases the friction ring 36 and the piston 14 via the interference at face 38 to retract within the bore 20. The amount of travel for the friction ring 36 and the piston 14 is set by the spacing 60.

In order to compensate for lining wear for the friction pad 16, the resistance generated by friction at face 38 is less than the force generated by the fluid pressure within pressure chamber 26. Therefore, it is possible for the piston 14 to move relative to the friction ring 36 provided the clearance between the friction pad 16 and the rotor 18 is greater than the spacing 61.

There are many modifications and/or variations of the present invention as described in detail herein. These modifications and/or variations, where feasible by one skilled in the art, are covered by the appended claims.

I claim:

1. In a disc brake having a piston retraction assembly, a caliper defining a bore for receiving a piston to substantially form a pressure chamber, the pressure chamber receiving pressurized fluid during braking to move the piston relative to the caliper, the retraction assembly cooperating with the caliper and the piston to substantially control withdrawal for the piston relative to the caliper upon termination of braking and a boot assembly cooperating with the caliper and the piston to isolate a sliding interface therebetween from the environment, characterized by said caliper bore including a recess at the open end, said retraction assembly comprising a friction ring engaging said piston and a resilient member biasing said friction ring to a first position engaging said caliper, said friction ring and said resilient member being disposed within said recess and said boot assembly including a portion extending into said recess to engage said resilient member, said friction ring being movable to a second position in response to movement of said piston to also engage said boot assembly portion whereby said boot assembly portion limits movement for said friction ring, and said friction ring being substantially L-shaped in cross section with an axially extending leg forming a radial clearance with an axially extending wall of said recess.

2. The disc brake of claim 1 further characterized by said axially extending leg being engageable with said boot assembly in said second position.

* * * * *